US006006517A

United States Patent [19]

Kownacki et al.

[11] Patent Number: 6,006,517

[45] Date of Patent: Dec. 28, 1999

[54] PNEUMATIC ENGINE

[75] Inventors: Charles D. Kownacki, Erie, Pa.; Jeffrey G. Rehkemper, Chicago, Ill.; Ronnen Harary, Toronto, Canada

[73] Assignee: Spin Master Toys, Ltd., Toronto, Canada

[21] Appl. No.: 09/178,595

[22] Filed: Oct. 26, 1998

Related U.S. Application Data

[60] Provisional application No. 60/081,045, Apr. 9, 1998.

[51] Int. Cl.[6] .......... F16D 31/02

[52] U.S. Cl. .......... 60/370; 60/407; 446/180; 446/211; 446/225

[58] Field of Search .......... 60/370, 407; 124/57, 124/70, 74; 137/588; 141/3, 20, 346, 347, 348, 349; 446/37, 56, 57, 176, 180, 181, 186, 187, 211, 207, 218, 225

[56] References Cited

U.S. PATENT DOCUMENTS

| | | | |
|---|---|---|---|
| 2,545,586 | 3/1951 | Pollak . | |
| 2,943,417 | 7/1960 | Greenspan et al. . | |
| 3,232,001 | 2/1966 | Stanzel . | |
| 3,310,024 | 3/1967 | McConnell . | |
| 3,739,764 | 6/1973 | Allport | 124/11 R |
| 4,159,705 | 7/1979 | Jacoby | 124/63 |
| 4,329,806 | 5/1982 | Akiyama et al. | 46/44 |
| 5,149,290 | 9/1992 | Reveen | 446/475 |
| 5,529,527 | 6/1996 | Watkins | 446/475 |
| 5,531,627 | 7/1996 | Deal | 446/473 |
| 5,634,840 | 6/1997 | Watkins | 446/475 |
| 5,772,491 | 6/1998 | Watkins | 446/475 |

FOREIGN PATENT DOCUMENTS

| | | | |
|---|---|---|---|
| 0151313 | 8/1985 | Germany | 446/176 |
| 0151314 | 8/1985 | Germany | 446/176 |

*Primary Examiner*—Hoang Nguyen
*Attorney, Agent, or Firm*—M. K. Silverman

[57] ABSTRACT

A fluid engine for use in pneumatically operated toys such as wheeled vehicles or airplanes includes an engine having a fluid input cavity which is in continuous fluid communication with a source of compressed air, a fluid delivery cavity which is in continuous communication with a piston cavity bounded by a moveable piston mounted in a cylinder member and which is separated from the fluid input cavity by a wall having a valve opening, and exhaust apertures which are separated from the fluid delivery cavity. A valve rod is movably housed to open the valve opening and close the exhaust apertures during the piston's power stroke, and to close the valve opening and open the exhaust opening during the piston's exhaust stroke. The valve rod is operatively connected to a piston to act in synchronism with it by the use of a cam integrally secured to a propeller power shaft.

10 Claims, 6 Drawing Sheets

PNEUMATIC ENGINE

REFERENCE TO RELATED APPLICATION

This application corresponds in subject matter to Provisional Application for Patent, Ser. No. 60/081,045, filed Apr. 9, 1998, entitled Pneumatic Engine.

BACKGROUND OF THE INVENTION

The present invention relates to fluid engines and, more particularly, to pneumatic engines adapted for use in toys such as aeroplanes and wheeled vehicles, including toy cars, trucks and trains. The invention is, particularly, directed to a piston-operated pneumatic engine. Accordingly, the only prior art relative thereto known to the inventor is that of U.S. Pat. No. 4,329,806 (1982) to Akiyama, entitled Fluid Engine, and the engine of an unpatented compressed air operated model aeroplane sold in the United Kingdom in or about 1990 known as the Jonathan, utilizing a so-called Z-model engine.

Addressing, firstly, the above reference to Akiyama, it differs, from that of the present invention in a number of material respects, these including differences in the respective input and exhaust mechanisms and in the relationship of the engine piston to the air inlet means to the interior of the engine cylinder. More specifically, Akiyama does not teach or indicate the possibility of a spring enhanced piston action, much less one for providing pressurized air input control to the engine cylinder.

With respect to the Jonathan device known in the United Kingdom, the same constitutes a direct predecessor of the instant invention which, however, differs therefrom in a number of respects and as such provides a far less efficient pneumatic engine for use with toy vehicles such as an aeroplane. More particularly, the Jonathan has two distinct modes of operation, one a high pressure mode when the air tank or air pressure canister thereof is at high pressure and a second mode when the air canister is at low pressure. Such a distinction between high and low pressure operations does not exist in the present invention.

Further, the Jonathan employs a piston diaphragm which constitutes the primary air input control means of that system. In distinction, the present system employs a one-way check valve which selectively co-acts with the piston to control air flow through the system intake manifold. Further, the Jonathan possesses two different exhaust channels, one in the lower cylinder housing and the other in the upper cylinder housing. In distinction, the instant system employs a single plurality of air exhaust apertures, all situated in the upper or proximal region of the cylinder housing.

More generally, the Jonathan does not afford efficient use of compressed air stored within the inflatable air canister and, as such, cannot achieve a comparable period of operation to that of the present invention. That is, to maintain operation of the system when the canister air pressure falls below a certain level, requires a distinct mode of engine operation during intervals of reduced pressure.

While the Jonathan, like the instant invention, makes use of a spring to enhance performance of the engine piston, the length and radius of the spring differ materially from that of the invention. Thereby, the Jonathan cannot optimally use the potential energy resident in the compressed air as it passes through the intake manifold into the engine cylinder housing. Also, the spring itself cannot contribute to system deficiency in the manner of the present invention.

It is noted that the use of compressed air power as a motive force for model aeroplanes and model vehicles has, in one form or another, existed in the art since approximately 1920. In such devices, so-called air motors which were constructed from brass and employed a three-cylinder arrangement for purposes of balance. The limiting factor in this technology was the air reservoir which, prior to the advent of contemporary plastics, was of necessity metallic. Such metal reservoirs, while having significant weight relative to the weight of the model aeroplane also did not possess properties of elasticity and resilience resident in modern plastics as, for example, exists today with two or three liter soda bottle. Accordingly, with the advent of a lightweight plastic soda bottle, a practical air container or canister, for use in a compressed air or pneumatic power plant for a so-called fluid expansion engine appeared. Thereby, the above-referenced invention of Akiyama marketed by Tome Kogyo Company of Japan and the Jonathan device with its Z-engine became possible.

The present invention may thereby be appreciated as a continuation of this process of development of compressed air and expansion pneumatic engines usable with a variety of toy vehicles including toy aeroplanes.

SUMMARY OF THE INVENTION

The within invention relates to a pneumatic compressed air engine for toy vehicles, the engine including a selectably inflatable air canister and an intake manifold having an engine air inlet in fluid communication with said air canister, the inlet including means for providing compressed air to said canister through the manifold. The pneumatic engine also includes a cylinder housing which is defined by distal and proximal regions thereof, an inlet in fluid communication with said engine air inlet and, at said proximal region, a plurality of air exhaust apertures. The engine further includes a one-way check valve including a proximal element, reciprocally situated at least partially within said engine air inlet, of the cylinder housing, the check valve residing in a normally closed position relative to the inlet. The engine further includes a piston slidably mounted along a longitudinal axis of said cylinder housing in a fluid-tight relationship to internal circumferential region walls of the distal region of the cylindrical housing. The piston includes an axial member projecting distally toward said cylinder housing inlet and proportioned in diameter for insertion thereunto. Said piston exhibits a substantially concave proximal surface. The pneumatic engine also includes a piston spring mounted about said axial member of said piston and having a length greater than said axial member. Thereby, at a distal end thereof, said piston spring exhibits a length sufficient to effect selectable contact with the proximal element of said check valve during intervals of high pressure between said piston and said distal cylinder housing. The engine also includes a connecting rod having a distal end proportioned for complemental non-rigid mechanical interface with said proximal surface of the piston. An eccentric is rotationally mounted to an engine power delivery shaft, said eccentric rotatably secured to a proximal end of said connecting rod, in which rotation of said eccentric by said rod transmits angular momentum to said system power shaft. Resultingly, reciprocation of said connecting rod by the eccentric will increase pressure between a distal side of said piston and enclosed internal portions of said distal cylinder housing, compressing said piston spring against said proximal element of said check valve. Thereby, potential energy is imparted to both said spring and the compressed air within said cylinder. As such, at a maximum of distal reciprocation, said proximal element of said check valve will urge open relative to said inlet of said of said cylinder housing, thereby effecting a brief high pressure input of compressed air from said canister, through said intake manifold into said distal region of the cylindrical housing. Said high pressure air input will thereby initiate an expansion of said piston spring and movement of the piston toward said proximal region of said cylinder housing, this causing reiterative cycles of reciprocation of said piston, connecting rod, cam and engine power shaft. The piston is returned to its zero or distal-most position b angular inertia from the cam and power shaft.

It is an object of the present invention to provide an improved compressed air expansion engine having particular use as a power source for toy vehicles.

It is another object to provide an inflatable pneumatic engine for toy vehicles having improved performance characteristics of stability, power, and flight duration over compressed air engines heretofore known in the art.

It is a further object to provide a pneumatic engine of the above type that can be manufactured through the use of lightweight non-molded plastic components.

It is a yet further object of the invention to provide a compressed air engine of the above type which can be economically manufactured and which is far more durable than such systems heretofore known in the art.

The above and yet other objects and advantages of the present invention will become apparent from the hereinafter set forth Brief Description of the Drawings and Detailed Description of the Invention.

BRIEF DESCRIPTION OF THE DRAWINGS

FIG. 2A thru 2C are sequential conceptual views showing he principles of co-action of the cam connecting rod and piston, in which FIG. 2B is taken along Line 2B—2B of FIG. 1.

DETAILED DESCRIPTION OF THE INVENTION

Figure 1:
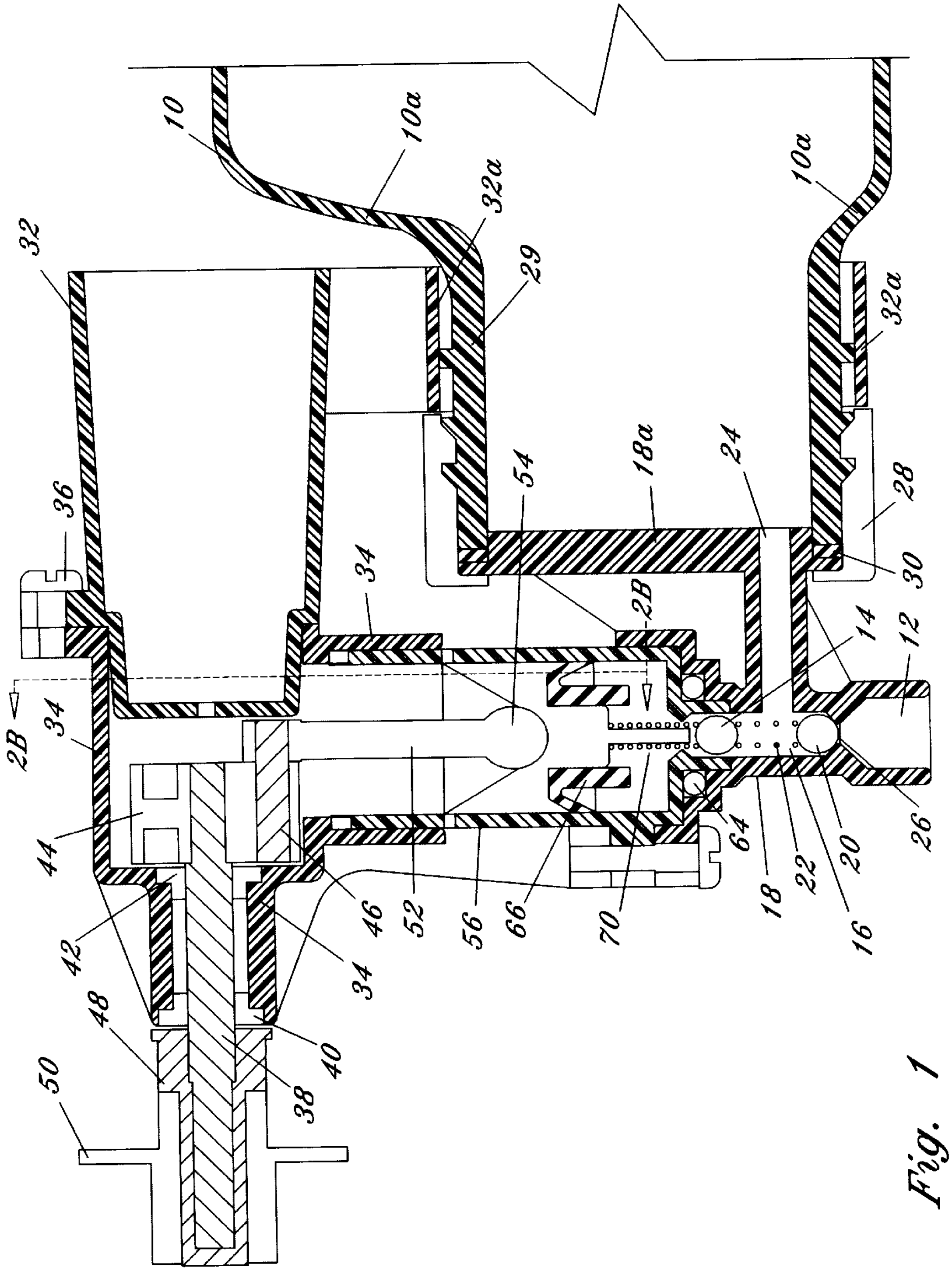
FIG. 1 is a cross-sectional view taken through the longitudinal centers of the main engine shaft, connecting rod, and piston of the present pneumatic engine, in which the cam thereof is at a zero degree position.

With reference to the schematic view of FIG. 1, there is shown a selectably inflatable compressed air canister 10 which is in the nature of a resilient polymeric plastic bottle such as the type of a two or three liter soda bottle. In one embodiment of the invention, the canister 10 will have a capacity of about 2.5 liters with the range thereof preferably between 2 and 3 liters. The canister 10, the geometry of which follows the aerodynamics of the toy vehicle that it is to power, is filled through a one-way check valve 12, which includes a proximal ball 14 situated within channel 16 of intake manifold 18. The check valve will optionally include a distal ball 20 which communicates with a proximal ball 14 through valve spring 22. The air canister 10 is filled with pressurized air by pumping through check valve 12 which in turn causes distal ball 20 of the check valve 12 to compress along the axis of spring 22 in the direction of the proximal ball 14. Spring 22 will compress sufficiently to permit passage of air through air aperture 26 of a distal part of channel 16 and therefrom into a channel 24 from which the air enters the air canister 10 for eventual usage with the pneumatic engine in the manner set forth below. Except during pumping, distal ball 20 will seal against the aperture 26 of the intake manifold 18 thereby providing a tight fluid seal of the compressed air in canister 10.

The intake manifold 18 also extends to the right to form a portion of a canister cap 18*a,* which portion is secured to a canister neck 29 of canister 10 by means of a retaining cap bracket 28. Provided between the canister neck 29 and the cap 18*a* of intake manifold 18 is a circumferential elastomeric gasket 30. It is noted that retaining cap bracket 28 and neck 29 of the canister 10 are both secured within an engine bracket 32 which is also secured to a proximal cylinder housing 34 through the use of a mounting screw 36. Further, the engine assembly is attached to air canister 10 by means of the intake manifold 18 and retaining cap 28. It is very important that the alignment of shaft 38 stay stationary, especially in that large forces impacting into, and perpendicular to, the centering of the shaft axis are common during normal usage. To eliminate any movement or excessive forces on intake manifold 18 the bracket 32 is attached to upper cylinder 34 with screw 36 and on an opposite end of bracket radial ring 32*a,* that is, to part of engine bracket 32. Radial ring 32 is held between vertical wall 10*a* or air canister 10 and retaining cap 28. The attachment of this engine bracket 32 is crucial in eliminating vibration and impact forces during normal usage of the vehicle.

A main engine shaft 38 is, through bearings 40 and 42, secured to a cam 44. (See also FIGS. 2A to 2C). Further, through said bearings 40 and 42, the main shaft 38 is rotationally secured to the proximal cylinder housing 34. Accordingly, shaft 38 rotates within the left hand part of proximal cylinder housing 34 and cam 44 rotates thereupon. The cam 44 is provided with a cam shaft 46, the operation of which is more fully described below.

To the left of bearing 40 is shown a propeller adapter 48 which is journalled upon main shaft 38. Thereon is mounted a nose cone adapter 50 over which the propeller of a model aircraft may be secured.

The position of cam shaft 46 relative to the proximal cylinder housing 34 which is shown in FIG. 1 is herein referred to as the zero degree position of the cam. At this rotational position of the cam 44 and cam shaft 46, connecting rod 52 and piston 54 are at their lowest, that is, distal-most position relative to the main shaft 38 of the system. The operation of cam 44 and connecting rod 52 relative to piston 54 may be more fully appreciated with reference to the sequential views of FIGS. 2A, 2B and 2C. These figures comprise radial cross-sectional views taken in the direction of Line 2B—2B of FIG. 1. The position of the engine of FIG. 1 shown in FIG. 2B, is the point of greatest extension of connecting rod 52 and piston 54 relative to the main engine shaft 38 upon which cam 44 rotates.

Figure 2C:
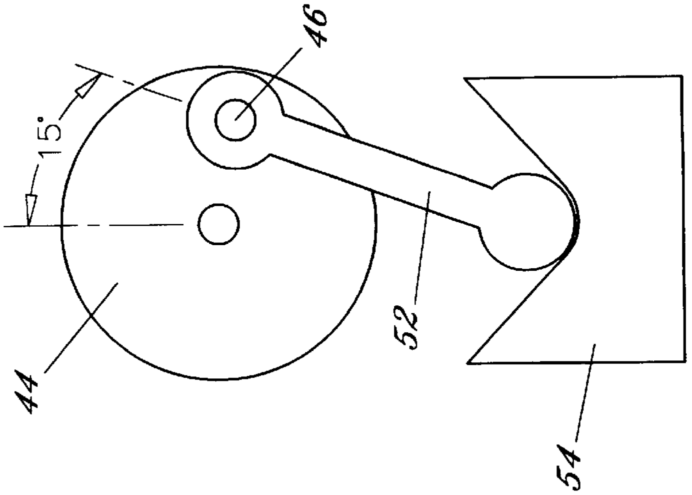
Figure 2B:
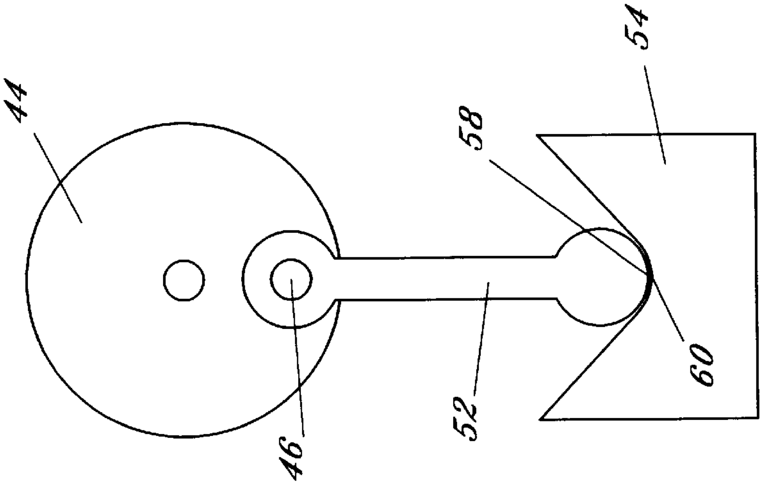
Figure 2A:
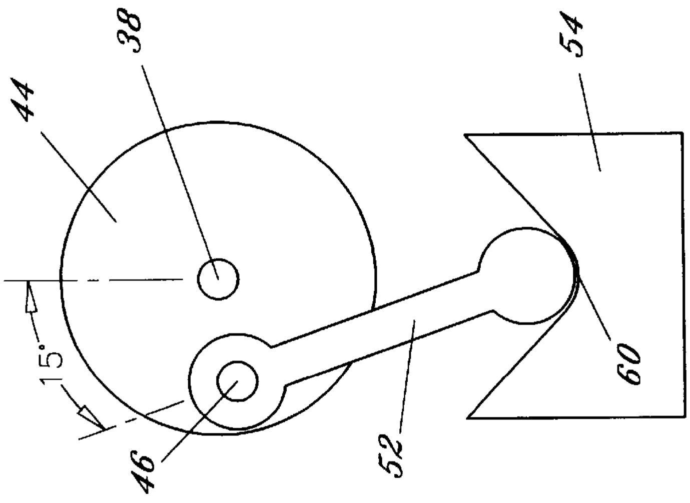

In FIG. 2A is shown a position of the connecting rod 52 relative to the zero position of FIG. 2B which is 15 degrees before the zero position. As such, the same would comprise the so-called 345 degree position, that is, a downstroke position of the engine, while the position of the connecting rod 52 and cam 44 shown in FIG. 2C would constitute the 15 degree, that is, an upstroke position of the engine. The significance of these rotational cam positions is further set forth below.

With further reference to FIGS. 2A through 2C, it is noted that the bottom of connecting rod 52 is provided with a substantially spherical bottom surface 58 which fits against a female spherical radius 60 of piston 54. Therein, connecting rod 52 is not attached to the piston 54 but rather simply mates against it through a low friction engagement which exists between spherical surface 58 of connecting rod 52 and female spherical radius 60 of piston 54.

It is noted that each rotation of cam 44, caused by rotation of main shaft 38, will cause connecting rod 52, mounted upon said cam shaft 46, to effect a net vertical linear, that is, up-and-down motion of piston 52 relative to main shaft 38 of 0.32 inches, i.e., approximately 8.5 millimeters. Accordingly, the power stroke of the instant engine, effected by the low frictionless action between the cam 44 and cam shaft 46, on the one hand, and male spherical surface 58 of connecting rod 52 and female spherical surface 60 of piston 54, on the other hand, is that of about 8.5 millimeters.

In further regard the schematic view of FIG. 1, it is noted that the engine cylinder housing includes said proximal housing 34 and a lower or distal housing 56. It is the distal housing 56 of the cylinder housing and a cylinder inlet 62 (see FIG. 3) which is in fluid communication with the inlet 16 of the intake manifold 18. The distal cylinder housing 56 is seated upon a sealing O-ring 64 which thereby sits upon the intake manifold 18.

By virtue of a piston seal 66, and a circumferential integral skirt 67 piston 54 is slidably mounted along a longitudinal axis of the distal cylinder housing 56 and assures a substantially fluid tight relationship between the piston and the internal circumferential walls of said distal housing 56. See FIG. 3.

Figure 3:
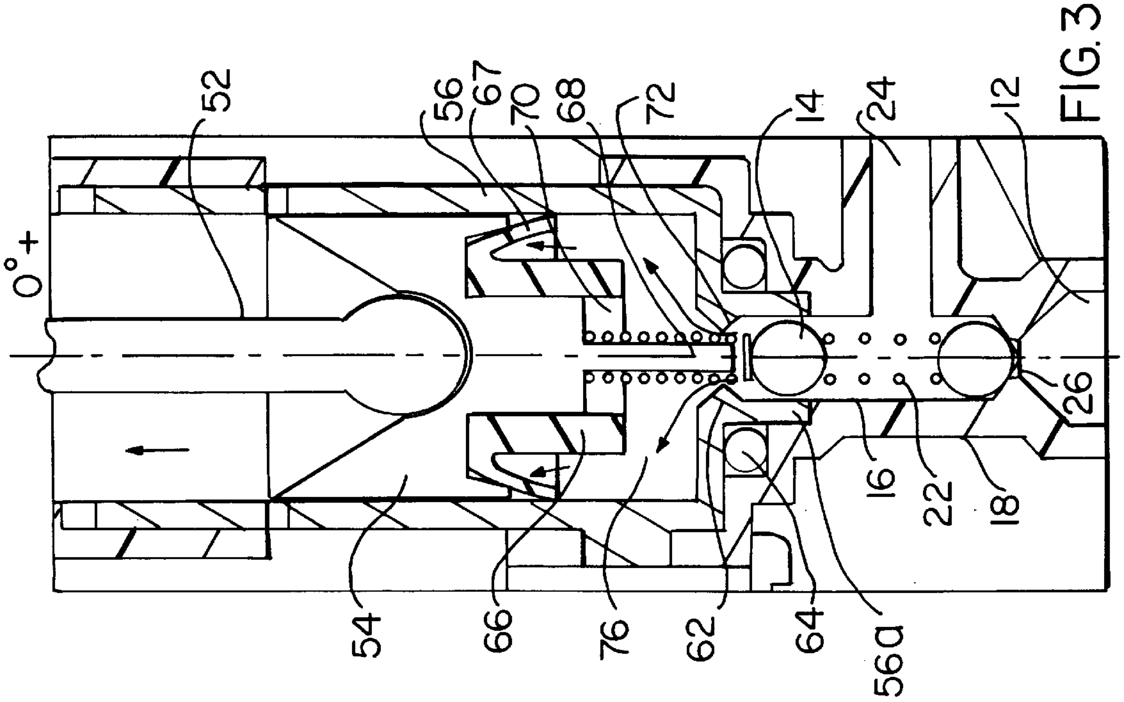
FIG. 3 is a fragmentary view of FIG. 1 showing that portion of the present engine including the piston, connecting rod, cylinder and intake manifold assemblies.
Figure 6:
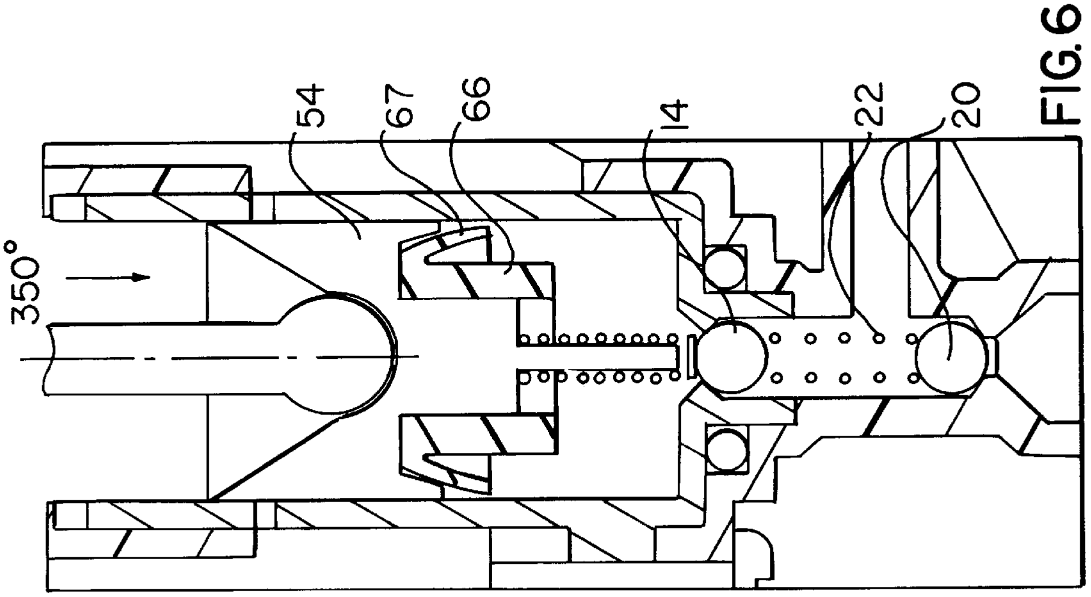
FIG. 6 is a schematic view sequential to the views of FIGS. 3 to 5 showing the cam at a rotational position of about 350 degrees.

The piston 54 includes an axial member 68 which projects distally toward said cylinder housing inlet 62 and is proportioned in diameter for insertion thereunto. Mounted about said axial member 68 is a piston spring 70 having an outside diameter which is barely sufficient to clear the cylinder housing inlet 62 and having a length sufficient to effect selectable contact with the proximal ball 14 of the one-way check valve within the intake manifold 18. Spring 70 plays a special role in the function of the present pneumatic engine by which there is provided to the engine much of its power. More particularly, as piston 54 moves downward within distal cylinder housing 56, the spring 70 will, as is shown in FIG. 3, contact proximal ball 14 which, prior to such contact, is held against a generally conical surface 72 at the entrance of the cylinder housing inlet 62. Prior to such spring contact, proximal ball 14 is held against conical surface 72 by reason of the air pressure against the distal side 56*a* of the ball 14 from the air canister 10 passing through channels 24 and 16 of the intake manifold 18. This is the condition which is shown in the views of FIGS. 4 through 7, more fully described below. Accordingly, only in the condition shown in FIGS. 1, 2B, 3 and 8, that is, in which the cam is at a zero degree position, that is, a maximum piston rod stroke extension, will the spring force of piston spring 68, less the spring force of check valve spring 22, be sufficient to overcome the air pressure against distal side 56*a* of ball 14. This force is calculated by multiplying the air pressure from the air canister 10, that is, approximately 100 pounds per square inch, times the area of the housing inlet 62, which has a diameter of about 1.7 millimeters. Thereby, the force necessary to accomplish closure of ball 14 against conical surface 72 and inlet 62 is 0.332 pounds. That is about 151 grams of force. Such opening of ball 14 can only be accomplished at the lowest point of the cam stroke, that is, the zero degree position shown in FIGS. 1, 2B, 3 and 8. Further, since spring 70 is only about one millimeter longer than the minimum distance required to open ball 14, only the downward-most position of piston 54 and, with it, of axial member 68 will effect an opening of the ball 14 relative to conical surface 72 of only one millimeter (in vertical linear terms), thereby allowing air to pass about the sides of ball 14 and into the distal cylinder housing 56. This process will enable air to pass about the spring 70 through inlet 62 as is indicated by arrows 76 in FIG. 3. As this occurs, air pressure will quickly equalize around ball 14 creating high pressure within the lowermost part of the cylinder housing 56, thus initiating the upward stroke of the piston 54 and connecting rod 52, causing skirt 67 of piston seal to expand radially against walls of said housing 56.

It is noted that an important function of spring 70, accomplished by careful selection of the spring rate thereof, is that the expansion of spring 70 against ball 14, prior to air pressure equalization about the ball permits a longer interval of compressed air from the air canister to enter the lowest part of the cylinder, than that existent in prior art compressed air engines. This results in a more powerful engine stroke. Further, by selection of a suitable spring constant, spring 70 will expand powerfully against ball 14 upon the initiation of the pressure stroke. The same is represented by the transition in piston positions shown between the zero degree cam position of FIG. 3 and the 20 degree cam position of FIG. 4, in which skirt 67 remains flush with the walls of housing 56, thereby assuring high pressure within said housing during the FIG. 4 phase of the engine stroke. It is, accordingly, to be appreciated that the view of FIG. 3 represents both completion of a downward stroke and the initiation of an upward stroke in which the downward stroke is completed when the spring force against ball 14 exceeds 151 grams.

Figure 4:
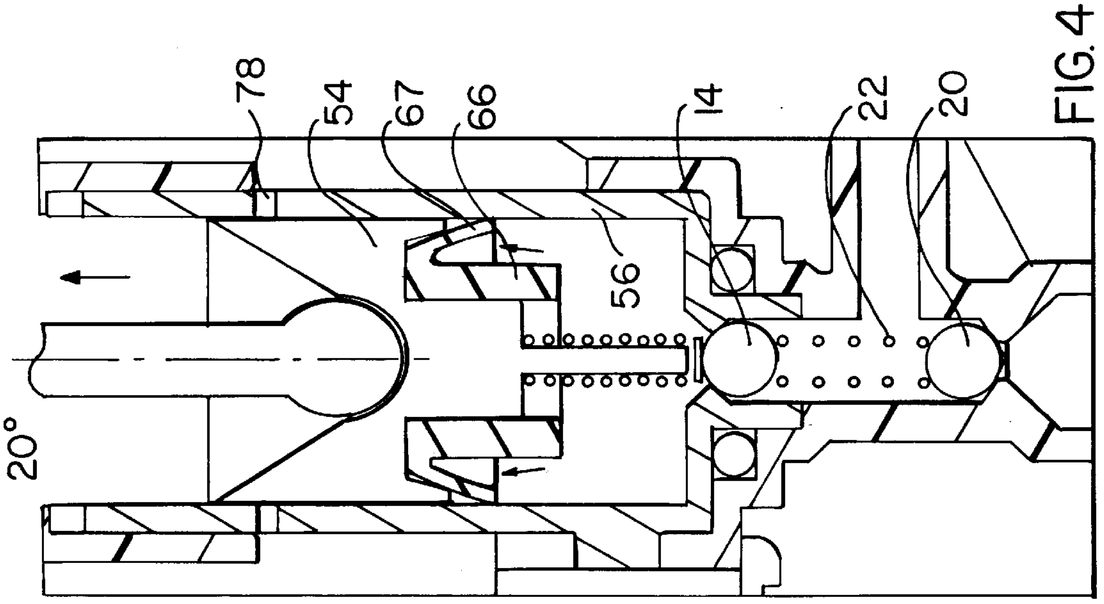
FIG. 4 is a view, sequential to the view of FIG. 1A showing the piston and connecting rod location at a twenty degree position relative to the fixed engine bracket.

The beginning of the upward motion of piston 54 is shown in FIG. 4, this corresponding to the twenty-degree position of the cam. Therein, high pressure within distal cylinder housing 56 piston moves the cylinder 54 upward and, with it, connecting rod 52, thus furthering the rotation of cam 44 and, with it, main shaft 38. During this entire period, ball 14 is closed while check valve spring 22, which connects balls 14 and 20, remains in an expanded state. Therein, piston spring 70 completes its push off from proximal ball 14 of the check valve 16.

Figure 5:
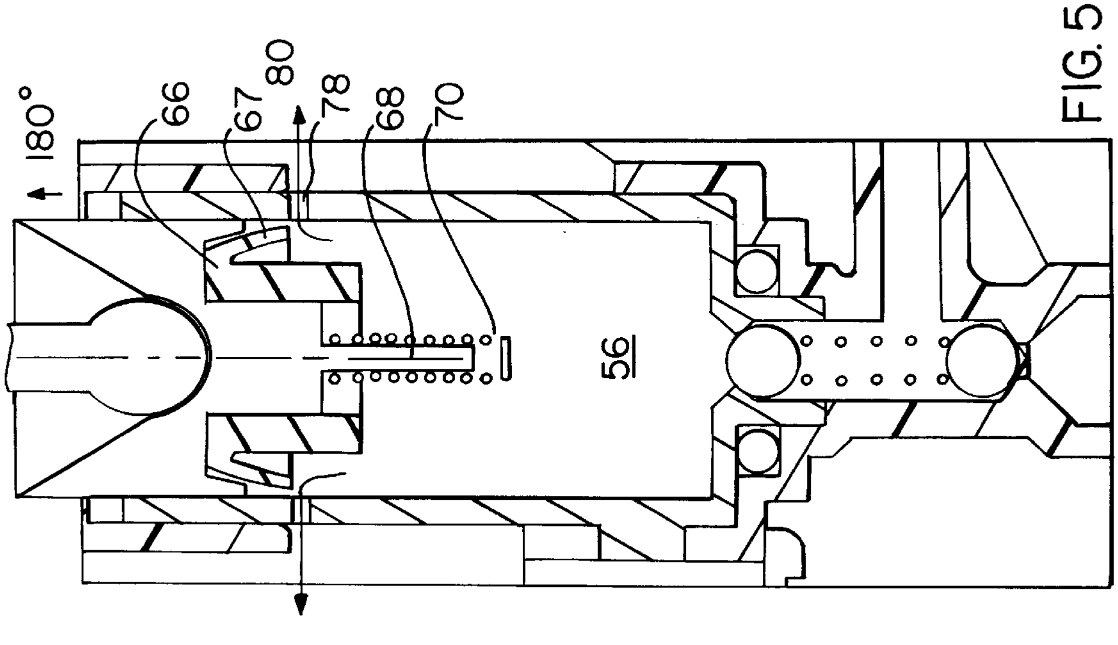
FIG. 5 is a view sequential to that of FIG. 3 and 4 showing the piston at its maximum height and the cylinder at its lowest atmospheric pressure, this with said cam at a 180 degree position relative to the engine bracket, the same representing the end of the up stroke and beginning of the down stroke.

Shown in FIG. 5 is the point of maximum height, that is, the top of the 8.5 millimeter stroke of the engine which corresponds to the point of lowest air pressure within distal cylinder housing 56. At that point, piston seal 66 will pass exhaust apertures 78 permitting escape of air from cylinder housing 56 thereby creating a relative vacuum therewith. This escaping air is shown by arrows 80.

Figure 8:
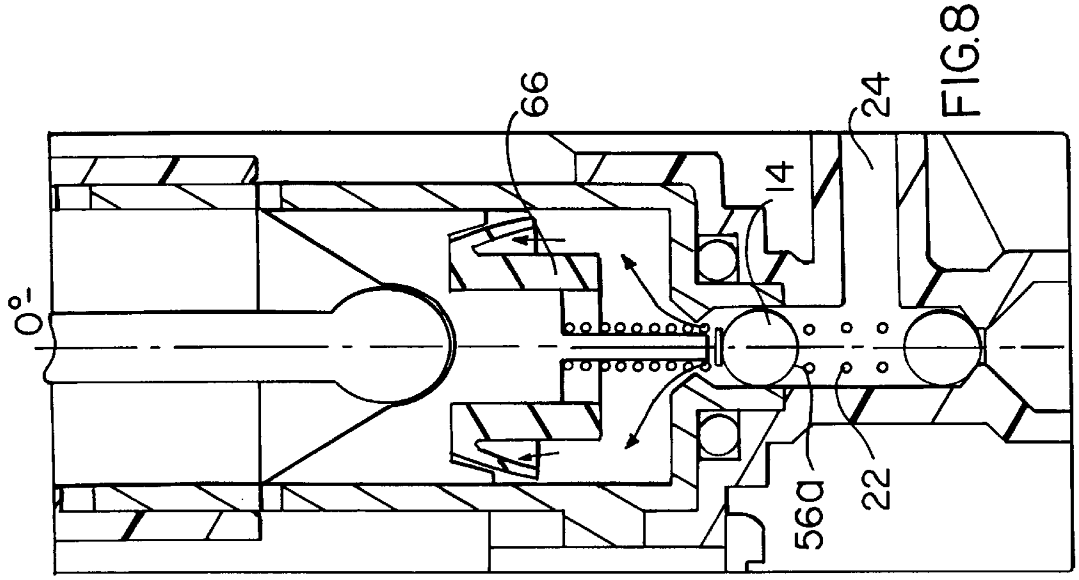
FIGS. 8 is a view sequential to the view of FIG. 7 showing the completion of one engine cycle. As such, FIG. 8 indicates the piston and check valve position an instant before that of the view of FIG. 3.
Figure 7:
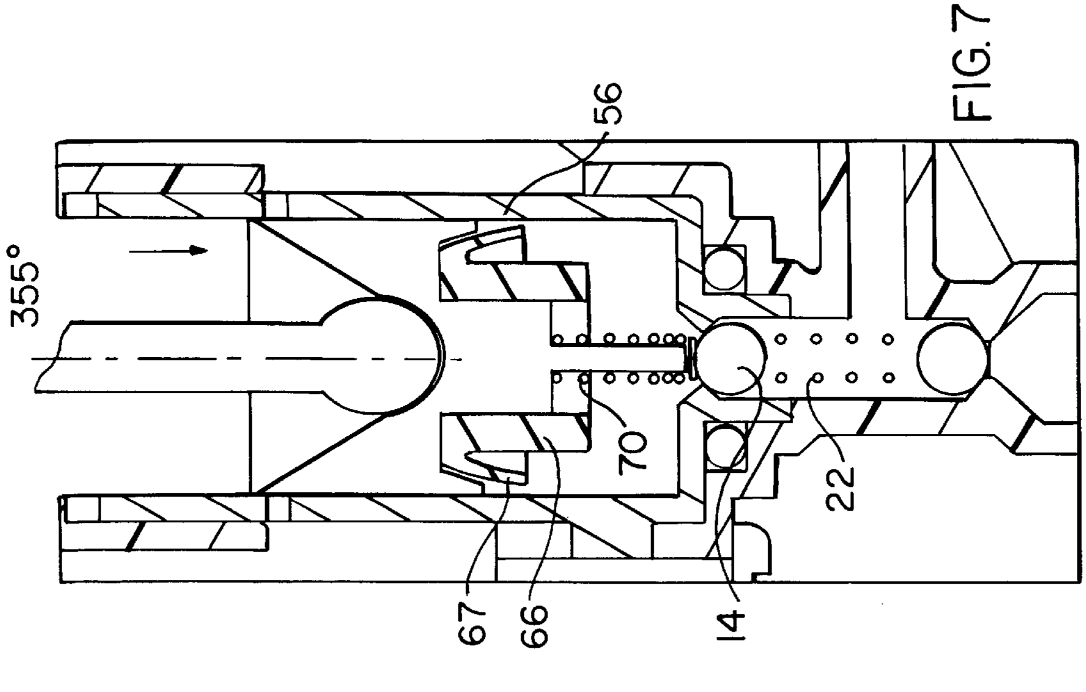
FIG. 7 is view sequential to the view of FIG. 6 showing the rotational cam position at about 355 degrees, that is, the first point of contact of the proximal element of the check valve by the piston spring.

After the maximum stroke height of FIG. 5 is accomplished, the angular inertia from the aircraft propeller, is transmitted, through shaft 38, to cam 44, to connecting rod 52 and to piston 54. This will, as is shown in the transition from FIG. 5 to FIG. 6, cause downward motion of the rod and piston. As this occurs, air pressure within distal cylinder housing 56 will increase as will potential energy within spring 70. This process continues causing spring 70 to contact ball 14 at about 350 degrees. In the view of FIG. 7 which corresponds to a cam position of 355 degrees, a point of near maximum pressure within distal housing 56 is accomplished. The 360 degrees or zero degrees position is shown in the view of FIG. 8. At that point, as above described with reference to FIG. 3, the spring force of spring 70 will overcome the 151 grams of force applied by the compressed air input from canister 10 against the distal surface **56*a* of ball 14**.

Summarizing this action, the power of the downstroke of the piston derives from the angular inertia of the propeller which, during a period of low cylinder pressure, is transmitted through the power shaft to the piston 54 and to the piston spring 70 during which potential energy is imparted to both said spring and to compressed air within distal cylinder housing 56. Conversely, power for the upward stroke of the piston derives from a combination of the mass and energy of the compressed air input and the release of potential energy within piston spring 70 as it pushes off of ball 14 at the beginning of the expansion process which is shown in FIG. 4. Therein, the one way check valve, as actuated by piston spring 70, keeps the supply of air from the air canister 10 closed for all but a brief interval during which the spring force of piston spring 70, less the spring force of one way check valve spring 22, overcomes the air pressure against surface **56*a* of ball 14 of the check valve. The spring force and spring rate of piston spring 70, as well as the narrow clearance of less than a millimeter between the outside diameter of the spring and the cylinder inlet 20, taken with the conical geometry 72 of housing inlet 62, all co-act to provide a reiterating high pressure air inlet of suitable duration, thereby initiating a process of engine expansion and compression respectively using the potential energy stored within the air canister 10 and spring 70**.

Figure 9:
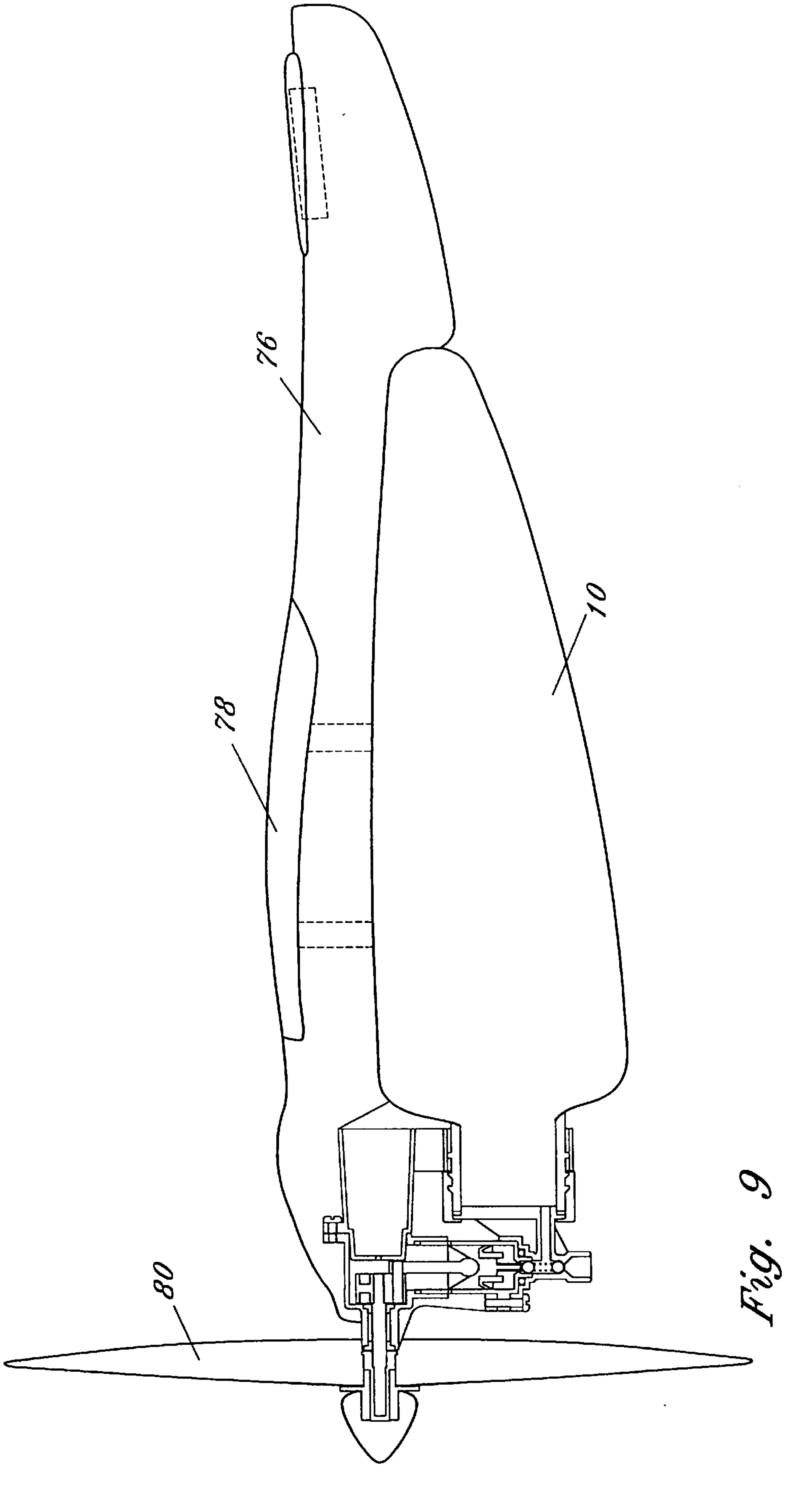
FIG. 9 is a schematic view showing the location of the engine assembly and compressed air canister relative to a vertical axial cross-section of a model aeroplane.

FIG. 9 is a schematic view showing the location of the entire engine assembly, as above described, and air canister 10, relative to fuselage 76, main wing 78 and propeller 80 of a model airplane equipped with the present inventive pneumatic engine.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention, as claimed herein.

We claim:

1. A fluid input assembly for a pneumatic engine for toy vehicles, the assembly comprising:

(a) a rechargeable inflatable resilient compressed air canister having a normally open mouth thereof; and (b) an intake manifold of said pneumatic engine, said manifold comprising an internal air inlet for complementally receiving said open mouth of said canister, said manifold further comprising means for enabling continuous flow of compressed air from said canister through said air inlet and to said pneumatic engine.

2. The assembly as recited in claim 1, said intake manifold further comprising:

(c) an external air inlet inclusive of a one-way check valve for permitting selectable external re-pressurization of said air canister without removal thereof from said internal air inlet.

3. The assembly as recited in claim 1, in which an interface of said intake manifold said mouth of said air canister and air canister defines means for complemental positive mechanical securement to thereby ensure secure fluid communication of said air inlet with air canister.

4. A fluid input assembly for a pneumatic engine for a toy vehicle, the assembly comprising:

(a) a rechargeable inflatable resilient compressed air canister having a normally-open mouth including thread means integrally formed upon an external surface of a mouth-defining neck of said mouth;

(b) a substantially circumferential retaining cap bracket including therein thread means proportioned for complemental securement about said thread means of said neck of said canister; and (c) an engine-to-canister bracket comprising means for mechanical securement of said canister to exterior surfaces of said pneumatic engine, whereby said canister is stabilized relative to said pneumatic engine.

5. The assembly as recited in claim 4, further comprising:

retaining mean s positioned about said mouth of said canister.

6. The assembly as recited in claim 4, further comprising:

an external air inlet for said air canister in continuous fluid communication with said input assembly by which selectable external re-pressurization of said canister may be accomplished.

7. A pneumatic engine for toy vehicles, comprising:

(a) a selectably inflatable compressed air canister;

(b) an intake manifold, comprising:

an engine air inlet, in fluid communication with said air canister, the inlet including means for providing compressed air to said canister through said manifold;

(c) a cylinder housing including:

(i) distal and proximal regions thereof, (ii) an inlet in fluid communication with said engine air inlet, and (iii) at said proximal region, a plurality of air exhaust apertures;

(d) a one-way check valve including a proximal element, reciprocally situated at least partially within said inlet of said cylinder housing, said check valve residing in a normally closed position relative to said inlet;

(e) a piston slidably mounted along a longitudinal axis of said housing in a substantially fluid-tight relationship relative to internal circumferential walls of said distal region of said cylindrical housing, said piston including an axial member projecting distally toward said cylinder housing inlet and proportioned in diameter for insertion thereinto, said piston having a substantially concave proximal surface thereof;

(f) a piston spring mounted about said axial member of said piston and having a length greater than said axial member and, thereby, at a distal end thereof, having a length sufficient to effect selectable contact with a proximally directed element of said check valve during intervals of high pressure between said piston and said cylinder housing;

(g) a connecting rod having a distal end proportioned for complemental non-rigid mechanical interface with said proximal surface of said piston;

(h) an eccentric rotationally mounted to an engine power delivery shaft, said eccentric rotatable secured to a proximal end of said connecting rod, in which rotation of said eccentric by said rod will transmit angular momentum and force to said system power shaft, whereby reciprocation of said connecting rod by said eccentric will increase pressure between a distal side of said piston and enclosed internal portions of said cylinder housing and will compress said piston spring against said proximal element of said check valve, thereby imparting potential energy to both said spring and compressed air within said cylinder and, further whereby, at maximum of distal reciprocation, said proximal element of said check valve will urge open relative to said inlet of said cylindrical housing, thereby effecting a brief high pressure input of compressed air from said canister, through said intake manifold and into said distal region of said cylindrical housing, said high pressure air input thereby initiating expansion of said piston spring and movement of said piston toward said proximal region of said cylinder housing, the same causing reiterative cycles of reciprocation of said piston, connecting rod, cam, and engine power shaft.

8. The engine as recited in claim 7, in which said intake manifold and air canister comprise means for complemental positive mechanical securement therebetween which ensures said fluid communication of said air inlet with said air canister.

9. The engine as recited in claim 2, in which securement means include a radial cap of said intake manifold having thread means for securement to said canister and an elastomeric seal seated between said intake manifold and said canister.

10. The engine as recited in claim 7, in which said piston comprises:

a piston seal, including a circumferential skirt proportioned in radius to inner walls of said housing, said seal integrally dependent from a proximal surface of said piston.

* * * * *